UNITED STATES PATENT OFFICE.

ROBERT E. DIVINE, OF CINCINNATI, OHIO, ASSIGNOR TO THE TWITCHELL PROCESS COMPANY, OF CINCINNATI, OHIO, A CORPORATION OF OHIO.

PROCESS OF USING SLUDGE SULFONIC ACIDS FOR SPLITTING.

1,319,027.     Specification of Letters Patent.     Patented Oct. 14, 1919.

No Drawing.     Application filed June 24, 1918. Serial No. 241,528.

*To all whom it may concern:*

Be it known that I, ROBERT E. DIVINE, a citizen of the United States, and residing at Cincinnati, in the county of Hamilton and State of Ohio, have invented a new and useful Process of Using Sludge Sulfonic Acids for Splitting, of which the following specification is a full disclosure.

My invention relates to a process of treating fats and oils in the manufacture of glycerin and fatty acids.

An object of the invention is to utilize a saponifier obtained from a heretofore waste material, namely sulfonic acids recoverable from aqueous solutions of the sludge resulting from the sulfonation of mineral oils or their distillates.

Another object is to promote the economic use of low grade fats and oils, rendered possible because of the relative cheapness of the sludge sulfonic acids.

Another object of the invention is to provide an improvement over or a modification of the disclosure of the Petroff Patent No. 1,079,437, of Nov. 25, 1913. The Petroff Patent No. 1,087,888, of Feb. 17, 1914, discloses the production of sulfonic acids from sulfonating a mineral oil or distillate. Petroff removes certain sulfonic acids from the sludge (B layer) by extracting with oil. It has been found that only a portion of the sulfonic acids are so recovered, and that if the sludge be treated with water, sulfonic acids can be extracted having different characteristics from the Petroff sulfonic acids. Notably the water-extracted sulfonic acids are soluble in an equal volume of water, are less soluble in oil than in water, are less soluble in ether than in water, have a different color and a somewhat different coefficient of splitting.

The sulfonic contents of the sludge recovered by water extraction are considerably greater in quantity than amounts recoverable by oil extraction, and in general, owing to color, are available for splitting lower grades of fats and oils than would be economically warranted by the cost of the Petroff sulfonic acids.

These sludge sulfonic acids may be variously produced.

An example, where, say an illuminating fraction is treated with $SO_3$ gas, would be as follows:

Mix one hundred parts of sludge into one hundred and fifty to two hundred parts of water, and allow it to stand for eight or twelve hours. Much heat is generated, sulfur-dioxid fumes are evolved, and the free oil will rise to the surface and is decanted. The under-layer is a clear, dark-colored liquid, in which a rose purple color is discernible. To this liquid I add sufficient lime to neutralize the solution and a portion of the lime combining with the free sulfuric acid, is precipitated and filtered off from the solution of the calcium sulfonate, resulting from the combination of the lime with the sulfonic acid.

This solution is a clear, red-wine colored liquid, to which I add sodium chlorid up to about twenty per cent. (20%) of the weight of the solution, and the mineral calcium sulfonate separates out of the saline solution, which retains the coloring matter and impurities and is recovered by filtration and freed from liquid matter by pressing or other suitable means.

When the materials are used in substantially the proportions indicated, one hundred pounds of sludge yields approximately from fifty to sixty pounds of the calcium compound.

The calcium sulfonate $(RSO_2O)_2Ca$ so produced, is dissolved in water and treated with sulfuric acid sufficient to precipitate out the calcium. The sulfonic acid is liberated and recovered by filtering off the insoluble calcium sulfate $Ca(SO_4)$.

(See my application, Serial No. 162,457, filed April 16, 1917.)

Another example of producing and treating a suitable sludge source where a fraction of relatively low boiling point is treated with fuming sulfuric acid, would be as follows:

Treat the fraction with fuming sulfuric acid and allow it to settle into a sludge layer and a supernatant oil layer, remove the sludge, and treat as follows:

(1) The sludge is first diluted with a medium heavy petroleum distillate, and after agitation and stratification the latter is drawn off, carrying with it a considerable proportion of the oil and oil soluble or mahogany acids which were originally entrained in the sludge. The remaining sludge is now substantially free of the heretofore known mahogany acids.

(2) Water is now added and the diluted sludge is thoroughly boiled and permitted to settle. The gravity of the separated acid layer should not be lower than 15° Baumé, the dilution being properly regulated to accomplish this result. By this treatment the bulk of the sulfuric acid present in the sludge is caused to stratify in the dilute solution at the base of the tank and may be drawn off.

(3) The supernatant sludge layer is now treated with $Na_2CO_3$ in sufficient proportions to neutralize the sulfonic acids as well as any sulfuric acid present, producing sodium sulfonates and sodium sulfate.

(4) The solution obtained by (3) *supra* is repeatedly extracted with naphtha for the removal of the remaining oil.

(5) The oil-free sodium sulfonates and sodium sulfate are now treated with free sulfuric acid, and upon settling the mixture stratifies into an upper layer of the green sulfonic acid and a lower layer of sulfuric acid. The sulfuric acid being drawn off, the new sulfonic acids remain in a state of purity suitable for the market. As a variant of the above described process a mixture of sodium sulfate, sodium sulfonates and oil produced by step No. 3 *supra* may be extracted with alcohol (ethyl or methyl), which is a solvent for the sodium sulfonates but will not dissolve either the sodium sulfate or the oil. These sodium sulfonates may be recovered from the alcohol extract by the simple distillation of the solvent.

The sludge sulfonic acids produced by these two examples, are practically alike as to their fat splitting properties, and readily distinguishable from the Petroff sulfonic acids (commonly called mahogany acids) in that these sludge sulfonic acids are soluble in water in the presence of oil, while the Petroff sulfonic acids are not.

The use of these water-extracted sulfonic acids because of their different characteristics, and greater cheapness, considerably extends the range of glycerin production at a relatively low cost.

These new sludge sulfonic acids comprise a viscous, dark, liquid, very freely soluble in water and having a relatively high coefficient of splitting, though the sulfonic acids from illuminating oil sludge has a relatively lower coefficient of splitting.

In my process the fats or oils are mixed with water and heated and agitated. A relatively small per cent. of the mineral oil sludge sulfonic acids and of a mineral acid are added, and the treatment is continued until the saponification is complete. Then when the separation or splitting has been effected the glycerin and fatty acids are separated from one another in the usual manner, the aqueous glycerin solution is neutralized and the constituents of the treatment acids separated by precipitation and filtration.

The products will not be of the high grade resulting from the use of the Petroff sulfonic acids with high grade fats and oils, but owing to the greater cheapness of this sludge sulfonic saponifier, and the lower cost of second grade fats and oils, commercial glycerin and fatty acids available for many uses, are obtained at a very low cost.

I thus provide a conservation of two heretofore relatively non-valuable materials, low grade fats and oils and mineral oil sludges.

Having described my invention, I claim:—

1. The herein described process of treating relatively low grades of fats and oils for the manufacture of fatty acids and glycerin, which consists in heating and agitating the fat with water, adding relatively small per cents. of a mineral acid and of a dark mineral oil sludge sulfonic material, consisting of a viscous liquid having a substantial fat-splitting coefficient, distinctly characterized by being soluble in water in the presence of mineral oil, agitating and heating the charge until the fatty acid and glycerin components are separated, neutralizing the aqueous glycerin solution and precipitating out the constituents of the treatment acids.

2. The herein disclosed process consisting in the use for splitting fats and oils of a saponifying reagent, consisting of sulfonic acids recovered from a water solution of sludge produced by sulfonating a portion of the contents of a mineral oil or distillate, and characterized by being freely soluble in an equal volume of water, and distinguished by being soluble in water in the presence of mineral oil.

In witness whereof, I hereunto subscribe my name, as attested by the two subscribing witnesses.

ROBERT E. DIVINE.

Witnesses:
D. DRACHENBERG,
L. A. BECK.